United States Patent [19]
Arizpe et al.

[11] Patent Number: 5,823,646
[45] Date of Patent: Oct. 20, 1998

[54] DOOR ASSEMBLY FOR OPTICAL HARDWARE CABINET

[75] Inventors: Ronald E. Arizpe, Watauga; Mark R. Dagley, North Richland Hills, both of Tex.; David C. Hall, Hickory, N.C.; Kevin L. Morgan, Paradise, Tex.

[73] Assignee: Siecor Corporation, Hickory, N.C.

[21] Appl. No.: 922,808

[22] Filed: Sep. 2, 1997

[51] Int. Cl.⁶ .................................................. A47B 88/00
[52] U.S. Cl. ...................... 312/324; 292/341.15; 292/42; 292/146; 385/135; 312/223.1; 312/315
[58] Field of Search .................... 312/324, 309, 312/315, 223.1; 292/341.15, DIG. 63, 42, 146; 385/135, 137

[56] References Cited

U.S. PATENT DOCUMENTS

| | | | |
|---|---|---|---|
| 516,005 | 3/1894 | Geer | 312/324 |
| 2,095,227 | 10/1937 | Brown | 312/315 |
| 4,118,085 | 10/1978 | Fibus | 312/324 X |
| 5,274,731 | 12/1993 | White | 385/135 |

*Primary Examiner*—Peter M. Cuomo
*Assistant Examiner*—Stephen Vu

[57] ABSTRACT

A wall mount cabinet is provided that has a front door that pivots downward and a side door that pivots out to the side. The side door is latched to the front door such that opening of the front door also opens the side door.

4 Claims, 2 Drawing Sheets

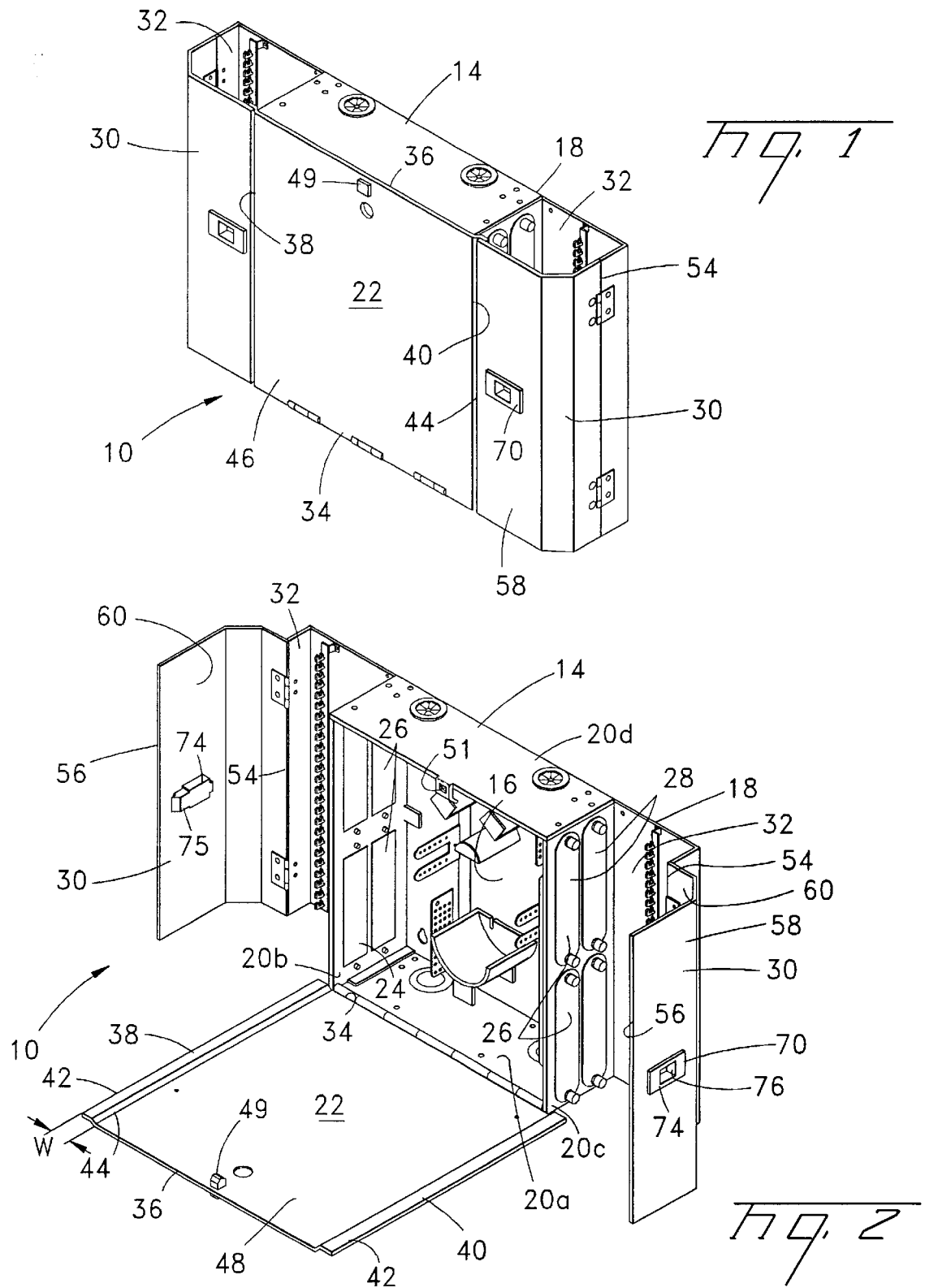

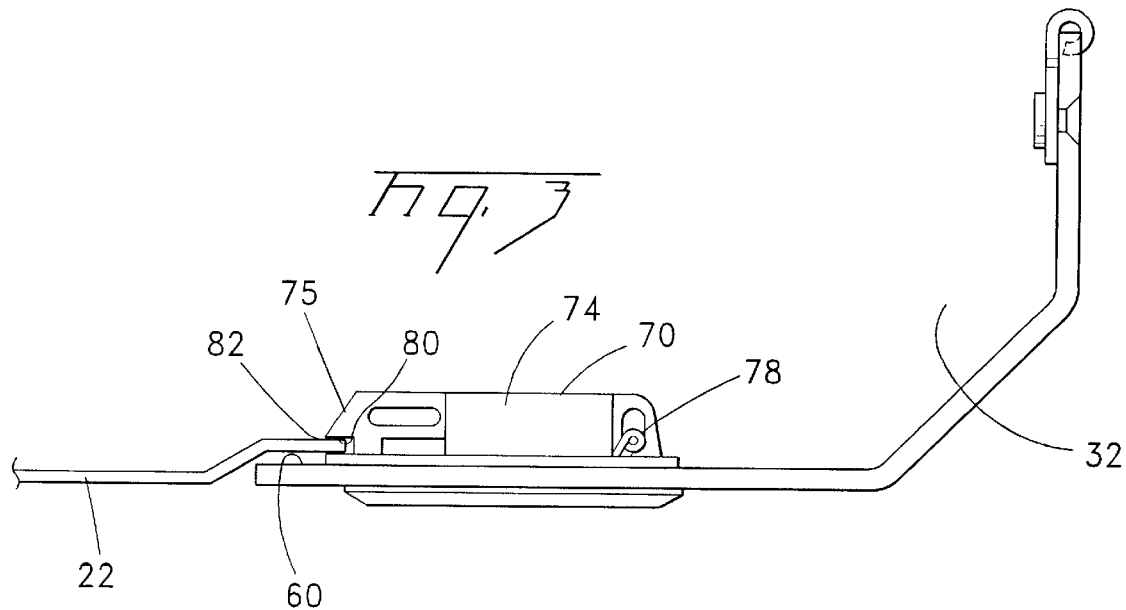
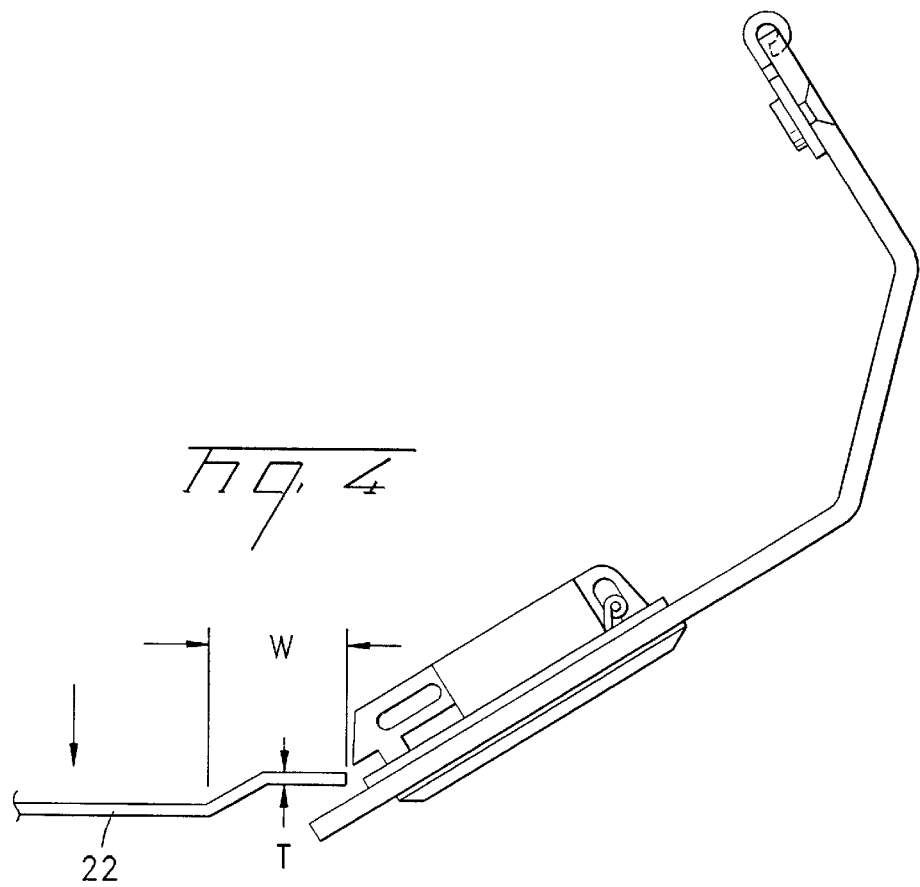

DOOR ASSEMBLY FOR OPTICAL HARDWARE CABINET

FIELD OF THE INVENTION

The present invention relates to a door assembly for an optical hardware cabinet. In one aspect, the present invention relates to a multi-door hardware cabinet where opening of one door opens all the doors.

BACKGROUND OF THE INVENTION

Optical hardware cabinets of the wall mount type typically have a housing that defines an interior and one or two sides where jumpers are connected to connector adapters on the side of the housing. One door closes over the interior of the housing and then a separate door closes over the side to protect the jumper connection to the side of the cabinet. When a craftsperson needs to install or access the cabinet, often both the interior and the jumper connections need to be accessed. In such a scenario, the craftsperson needs to open the two or three different doors one at a time to expose the different portions of the cabinet. A need exists for a wall mount cabinet with a door assembly that allows ready access to all portion of the wall mount cabinet with the opening of one door.

SUMMARY OF THE INVENTION

The present invention achieves the simultaneous opening of the doors by latching the side doors to the front door in such a way that opening of the front door first opens all the doors. In one aspect, the present invention provides a fiber optic cabinet comprising a housing with a back panel and top, bottom and side walls extending therefrom defining an interior. A front door is pivotally attached to one of the side walls along a horizontal axis and closeable over the interior. The front door is wider than the distance between the side walls to define wing portions that overhang laterally of the side walls. At least one side door is pivotally attached to the back panel along a vertical axis at a point laterally removed from the side walls and the side door has a free side opposite thereto extending vertically and overlaying one of the wing portions of the front door. A latch is attached to the side door having a slidable tongue portion spaced from and extending parallel with the inside of the side door to define a gap therebetween. The one wing portion extends into the gap. The tongue portion is slidable in a direction away from the free side to allow the side door to be pivoted open. The interengagement of the tongue portion with the gap is sufficiently flexible such that the wing portions will slide out of the gap when the front door is pivoted away from its closed position.

BRIEF DESCRIPTION OF THE DRAWINGS

FIG. 1 is a perspective view of the preferred embodiment of the wall mount cabinet of the present invention with the doors closed;

FIG. 2 is a perspective view of the wall mount cabinet of FIG. 1 with the doors open;

FIG. 3 is a top view of the interengagement of the doors in the closed position; and FIG. 4 is a top view of the doors upon opening.

DETAILED DESCRIPTION OF THE PREFERRED EMBODIMENTS

With reference to FIGS. 1–4 the preferred embodiment of wall mount cabinet 10 of the present invention is shown. Cabinet 10 has housing 14 with back panel 18 and walls 20a–d defining interior 16 closeable by front door 22 that is pivotally attached to bottom wall 20a to pivot about a horizontal axis. Interior 16 is where optical fibers are brought in to connect to first side 24 of adapter panels 26 that are removably mounted to side walls 20b, c of housing 14. Second side 28 of adapter panels 26 face outside of housing 14 into routing channel 32 where jumpers are brought to connect to second side 28 of adapter panels 26. Back panel 18 extends laterally of side walls 20b, c on each side and side doors 30 are pivotally attached along a vertical axis to back panel 18 to close over channel 32 to protect the connections of the jumpers to adapter panels 26.

Front door 22 has hinged side 34 where front door 22 is pivotally attached to bottom wall 20a and top side 36 opposite thereto. Front door 22 also has left side 38 and right side 40 and is wider than the distance from side wall 20b to side wall 20c defining wing portions 42 that extend laterally beyond side walls 20b and 20c. Wing portions 42 have overhang width W and thickness T. Preferably wing portions are stepped toward back panel 18 creating step 44 from the top to the bottom of front door 22. Front door also has front surface 46 facing away from back panel 18 and rear surface 48 which faces toward back panel 18. Front door 22 also has latch 49 for holding front door closed to catch 51 on housing 14.

Side doors 30 have hinged side 54 extending vertically and free side 56 opposite thereto and extending generally parallel with hinged side 54 as well as left side 38 and right side 40 of front door 22 when front door 22 is closed over interior 16. Side door 30 is sized such that free side 56 lays over wing portion 42 and close to step 44 to give a flush appearance from front door 22 to side door 30. Side door 30 has outside surface 58 facing away from cabinet 10 and inside surface 60 toward cabinet 10.

Latch assembly 70 is mounted through side doors 30 near free side 56. Latch assembly 70 is spring mounted in a hole in side door 30 and is slidable in the lateral direction. Latch 74 has tongue portion 75 that is inside of side door 30 and has pull portion 76 on the outside of side door 30 that can be pulled from outside the cabinet in the lateral direction against the bias force of spring 78. Tongue portion 75 has first surface 80 parallel with and facing toward inside surface 60 of side door 30 defining gap 82.

Latch assembly 70 is located where in the closed position of all the doors, wing portion 42 extends into gap 82. If it were desired to open only side door 30, pull portion 76 of latch 74 is slid in the lateral direction away from free side 56 until tongue portion 75 slides away from wing portion 42 allowing side door 30 to be pivoted away to expose channel 32.

If it is desired to open front door 22 as well as side doors 30, front door is simply pulled open and wing portions 42 will pop out of gap 82 and because side doors 30 are only latched to wing portions 42, side doors 30 are also opened. In order to provide for wing portions 42 being able to pop out of gap 82, thickness T of wing portions 42 is sufficiently less than gap 82, tongue portion 75 is sufficiently flexible away from inside surface 60 of side door 30, and/or wing portions 42 do not overextend into gap 82. Gap 82 does not need to be very deep in order to hold side doors closed over the closed front door 22 and so when front door is then opened, the wing portions readily pull out of gap 82.

Although the present invention has been described with respect to a preferred embodiment, it should be understood that various changes, substitutions and modifications may be suggested to one skilled in the art and its is intended that the present invention encompass such changes, substitutions and modifications as fall within the scope of the appended claims.

That which is claimed is:

1. A fiber optic cabinet comprising:

(a) a housing with a back panel and top, bottom and side walls extending therefrom defining an interior;

(b) a front door pivotally attached to one of the side walls along a horizontal axis and closeable over the interior, the front door wider than the distance between the side walls to define wing portions that overhang laterally of the side walls;

(c) at least one side door pivotally attached to the back panel along a vertical axis at a point laterally removed from the side walls, the side door having a free side opposite thereto extending vertically and overlaying one of the wing portions of the front door;

(d) a latch attached to the side door having a slidable tongue portion spaced from and extending parallel with the inside of the side door to define a gap therebetween, the one wing portion extending into the gap, the tongue portion slidable in a direction away from the free side to allow the side door to be pivoted open, the interengagement of the tongue portion with the gap sufficiently flexible such that the wing portions will slide out of the gap when the front door is pivoted away from its close position.

2. The cabinet of claim 1 comprising two side doors, one on each side of the front door.

3. The cabinet of claim 1 wherein the wing portions of the front door are stepped in toward the back panel and the side door lays over the wing portion to provide a flush appearance.

4. The cabinet of claim 1 wherein the vertical axis of rotation of the side door is set back from the plane of the front door in the closed position and the side door extends from the vertical axis in a plane perpendicular to the plane of the front door and then turns to extend in the same plane as the front door.

* * * * *